June 29, 1937.  B. N. EWING  2,085,462
SCROLLWORK CUTTER
Filed June 13, 1934  2 Sheets-Sheet 1
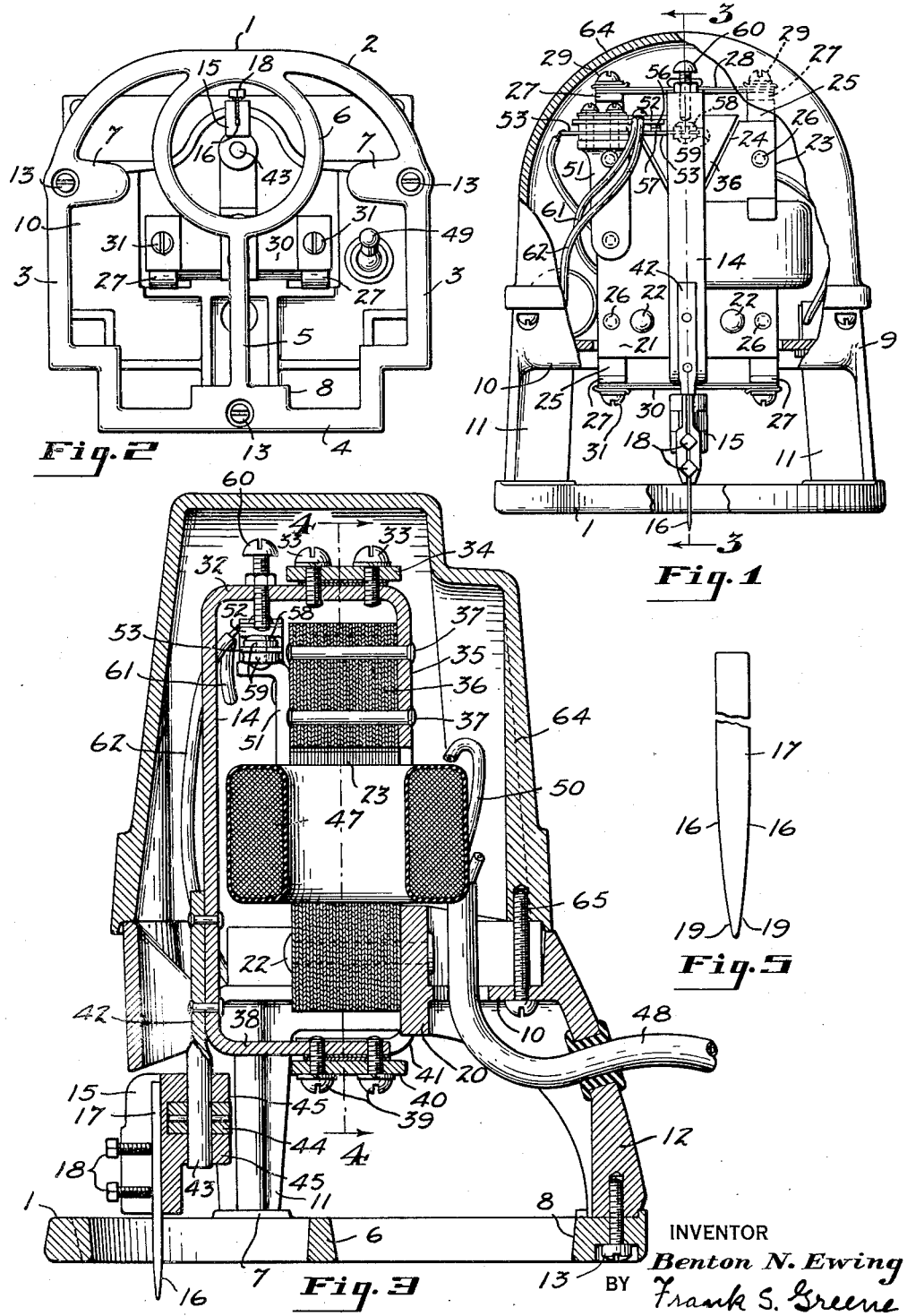
INVENTOR
Benton N. Ewing
BY Frank S. Greene
ATTORNEY June 29, 1937.　　　　B. N. EWING　　　　2,085,462
SCROLLWORK CUTTER
Filed June 13, 1934　　　2 Sheets-Sheet 2

INVENTOR
*Benton N. Ewing*
BY *Frank S. Greene*
ATTORNEY

Patented June 29, 1937

2,085,462

UNITED STATES PATENT OFFICE 2,085,462

SCROLLWORK CUTTER

Benton N. Ewing, Fayetteville, N. C., assignor to Martin Brothers Electric Company, Cleveland, Ohio, a corporation of Ohio Application June 13, 1934, Serial No. 730,458

8 Claims. (Cl. 30—273)

This invention relates to scrollwork cutters and has for its object to provide a cutter in the form of a unit adapted to slide upon and be guided over the surface of the material being cut and having a rapidly reciprocating blade adapted to project below the face of the unit into the material being cut.

A further object is to provide a small and compact machine having a base adapted to slide in any direction on the material being cut and having a blade which projects below the base, said blade being rapidly reciprocated vertically, and which is so mounted that it automatically adjusts itself to the direction of movement of the base.

A further object is to provide a machine of the character above described with a means for imparting very rapid reciprocating movements to the cutter blade and at the same time setting up vibrations in the supporting frame which will reduce the friction between the base of the frame and the surface upon which it slides, so that little effort is required to move the cutter over the surface of the material.

A further object of the invention is to provide a cutter in which the blade operating mechanism is spaced above the base, and the blade operates in an opening in the base which is of a size sufficient to permit the operator to see the blade and the material adjacent the blade so that the cutter may be properly advanced over the material being cut.

A further object is to provide a cutter in the form of a compact, ruggedly constructed unit which can readily be moved manually as desired over the surface of the material being cut.

A further object is to provide an electromagnetic vibrator for actuating the cutter blade, in which the full thrust of the electromagnet is applied directly to the cutter blade.

With the above and other objects in view, the invention may be said to comprise the device as illustrated in the accompanying drawings hereinafter described, and particularly set forth in the appended claims, together with such variations and modifications thereof as will be apparent to one skilled in the art to which this invention appertains.

Reference should be had to the accompanying drawings forming a part of this specification, in which:

Figure 1 is a front elevation of the machine, with a portion of the casing broken away to show the mechanism;

Fig. 2 is a bottom plan view of the base of the machine;

Fig. 3 is a section taken on the line indicated at 3—3 of Fig. 1;

Fig. 5 is a side elevation of the cutter blade on an enlarged scale;

Figure 4:
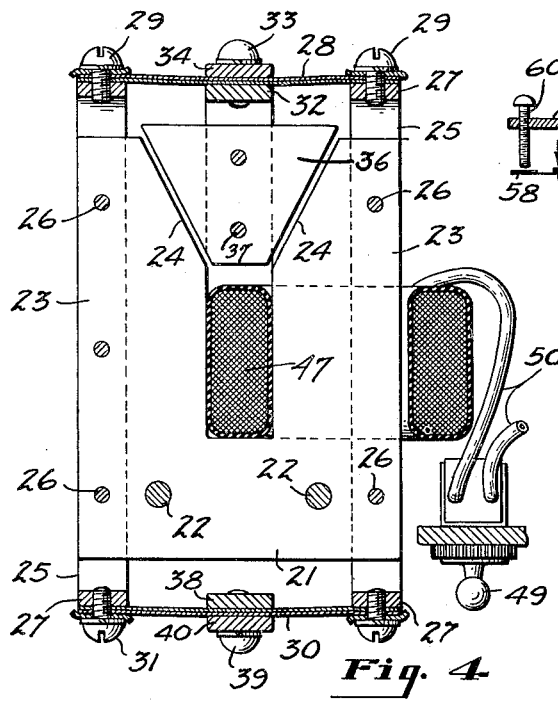
Fig. 4 is a section taken on the line indicated at 4—4 in Fig. 3.
Figure 6:
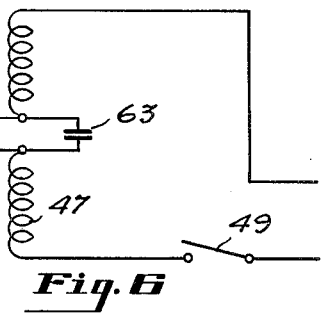
Fig. 6 is a wiring diagram of the electromagnet circuit which may be used with either direct or alternating current.

The cutter of the present invention is in the form of a compact unit mounted upon a supporting base 1 which, as best shown in Fig. 2, is of skeleton form. The base which is formed in one piece has a curved front bar 2, straight side bars 3, and a straight rear bar 4. The front and rear bars are joined centrally by means of a bar 5 extending forwardly from the center of the rear bar and integral with a ring 6 which is also integral with the front bar centrally thereof, the ring 6 providing a circular opening of substantial size in which the cutter blade operates. The side bars 3 are provided with enlargements 7 adjacent their forward ends which provide supporting sockets and the rear bar is provided centrally thereof with an enlargement 8 which provides a third supporting socket.

Mounted upon the base 1 there is a mechanism supporting casting 9 which has a rectangular mechanism supporting portion 10 which is spaced a substantial distance above the base 1 by means of supporting legs 11 and 12. The two front supporting legs 11 are secured in the sockets 7 and the rear supporting leg 12 is secured in the socket 8, each leg being secured in its socket by suitable means such as a screw 13.

The cutter mechanism includes a vertically reciprocating carrier 14 to the lower end of which is swiveled a blade carrying arm 15 which turns about an axis extending in the direction of reciprocation and which provides a support for a cutter blade 16 which is offset laterally with respect to the swivel axis. The blade 16 has a flat rectangular shank 17 which is adjustably secured in the arm 15 by means of set screws 18. The blade 16 has its front and rear edges ground at the lower end so that the lower end of the blade tapers to a point and the side faces thereof taper to front and rear downwardly converging cutting edges 19, the cutter blade being positioned with its cutting edges in a plane disposed radially with respect to the swivel axis, so that the blade will readily follow the direction of movement of the supporting frame.

During the operation of the machine, the blade is positioned to project the desired distance beneath the bottom of the base 1, and since the base 1 is a skeleton base at a distance below the mechanism supporting portion 10 of the frame, the cutter blade and the portions of the work adjacent the blade can readily be seen by the operator.

During the operation of the machine, the cutter unit is moved in any direction over the material being cut, which may be one or more layers of sheet material such as cardboard, paper, or the like, and due to the swivel mounting of the blade and the radial disposition thereof, the arm 15 will swing to a position where the blade is trailing the swivel, and may be caused to follow an irregular line on the work being cut by sliding the unit on the material.

Means is provided for imparting a very rapid reciprocating movement to the blade carrier, and this blade carrier reciprocating means is preferably so mounted in the frame that vibration is also imparted to the frame which materially lessens the friction between the base and the material upon which it rests, so that the unit can be readily pushed over the work in any direction to cause the blade to follow a desired line of cut.

The rectangular body portion 10 of the mechanism supporting casting provides a central aperture in which the blade carrier 14 operates and the rear bar of the rectangular supporting portion 10 is provided with a web 20 to which a laminated U-shaped core 21 is rigidly secured by suitable means such as rivets 22. The core 21 has spaced vertical arms 23, the upper ends of which are beveled to provide converging inner faces 24.

To the rear face of each of the vertical arms 23 there is rigidly secured a strap 25, the straps being fastened to the arms by suitable means such as rivets 26. The straps 25 are U-shaped and have forwardly extending arms 27 at their upper and lower ends, the upper arms being spaced above the upper ends of the arms 23 and the lower arms being spaced below the bottom of the core 21. A leaf spring 28, consisting of superposed strips of thin spring steel is secured at its ends to the upper forwardly projecting arms 27 of the straps 25 by means of screws 29. A similar leaf spring 30 is attached at its ends to the lower, forwardly projecting arms 27 of the strap 25 by means of screws 31. The springs 28 and 30 are positioned above and below the laminated core 21 centrally of and parallel with the top and bottom edges thereof.

The carrier 14 is in the form of a strap, the body portion of which is positioned in front of the core 21 centrally thereof and has a rearwardly extending arm 32 at its upper end which extends beneath the spring 28 and which is rigidly secured to the spring by means of screws 32. Screws 33 are threaded into the arm 32 and extend through a clamping plate 34 and the spring 28 which is interposed between the clamping plate 34 and the arm 32. At its rear end the arm 32 is bent downwardly to provide an attaching portion 35, to which a wedge-shaped laminated armature 36 is rigidly attached by suitable means such as rivets 37. At its lower end, the carrier 14 is provided with a rearwardly extending arm 38, to the under side of which the spring 30 is rigidly attached by means of screws 39 and a clamping plate 40. The arm 38 extends beyond the spring 30 and has an upturned end portion 41 which is engageable with the bottom edge of the web 20 of the supporting frame to limit the upward movement of the blade carrier 14. The wedge shaped armature 36 is tapered to fit between the beveled faces 24 of the core arms and is normally held in a position spaced upwardly from the core by the springs 28 and 30.

In the operation of the machine, the core is intermittently energized, drawing the armature into engagement therewith, and upon deenergization of the core the armature is moved upwardly by the springs 28 and 30. On the downward movement of the blade carrier and armature, there is impact between the armature and the core rigidly supported on the frame, and upon upward movement of the armature and carrier the end 41 of the arm 38 has impact against the web 20 of the frame casting.

While the machine is in operation, the blade carrier reciprocates rapidly and the carrier has a hammering action on the frame and sets up vibrations which greatly lessen the friction between the base 1 and the material upon which it is supported, so that very little force is required to slide the machine over the work.

The blade carrying arm 15 is supported on a bearing member 42 rigidly secured to the carrier 14 and having a cylindrical bearing portion 43 projecting below the arm 38. A collar 44 is pinned to the bearing portion 43, and the arm 15 has a knuckle with bearing portions 45 which turn upon the cylindrical bearing portion 43 above and below the collar 44.

The core 21 is energized by means of a coil 47 which is wound about one of the arms 23. The coil 47 receives electric current through an extension cord 48 which is connected to the coil through a manually operated switch 49 and wires 50.

It is usually preferable to provide means adapting the device to be operated either by direct or alternating current. To this end, means is provided for automatically interrupting the current through the coil during the downward movement of the armature by means of a circuit breaker, which includes a switch mounted on a bracket 51 secured to the front face of the core 21. The switch consists of a rigid conductor element 52 and a spring conductor element 53 secured at one end to the bracket 51 by screws 54, suitable insulating spacers 55 being provided between the conductor elements, and the conductor elements being provided with contact points 56 and 57. The spring conductor element 53 extends beyond the rigid conductor element 52, and beneath the rearwardly extending arm 32 of the carrier 14. The projecting end of the conductor element 53 carries a button in the form of a rivet 58 insulated from the spring conductor element 53 by insulating washers 59. Directly over the button 58 the arm 32 carries a vertical screw 60 which, during downward movement of the arm, engages the button 58 and pushes the spring 53 downwardly to separate the contact points 56 and 57. The conductor elements 52 and 53 are connected to the coil preferably intermediate the ends thereof by wires 61 and 62. When the extension cord 48 is plugged into a direct current line, the circuit through the coil 47 is broken each time the armature is pulled into engagement with the core and the circuit is reestablished during the upward movement of the armature. A condenser 63 is preferably connected across the contact points 56 and 57 and the wires 61 and 62 are preferably connected to the coil intermediate the ends thereof, the purpose of the intermediate connection and of the condenser being to prevent transmission of electrical oscillations to the main power line which would affect radio receiving sets plugged into the line.

When the device is used on an alternating current line, all that is necessary is to adjust the screw 60 upwardly a sufficient distance to clear the spring arm of the circuit breaker.

Figure 7:
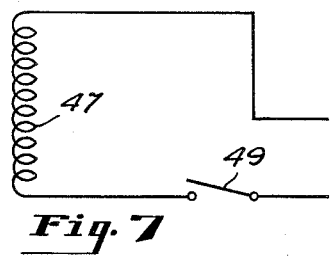
Fig. 7 is a wiring diagram showing a circuit suitable for alternating current only.

If the device is to be used only on an alternating current line, the circuit breaker may be omitted entirely as indicated in Fig. 7.

The actuating mechanism is preferably enclosed by a cover 64 which rests upon the top of the rectangular supporting portion 10 of the casting. This cover may be secured in place by suitable means such as the screw 65.

In some instances it may be desirable to operate the cutter at an angle to the vertical in order to make a bevel cut, and in order to position the cutter blade for such cuts, the mechanism supporting portion of the frame may be mounted upon the base to swing about a horizontal axis extending centrally of the base from front to rear.

Figure 8:
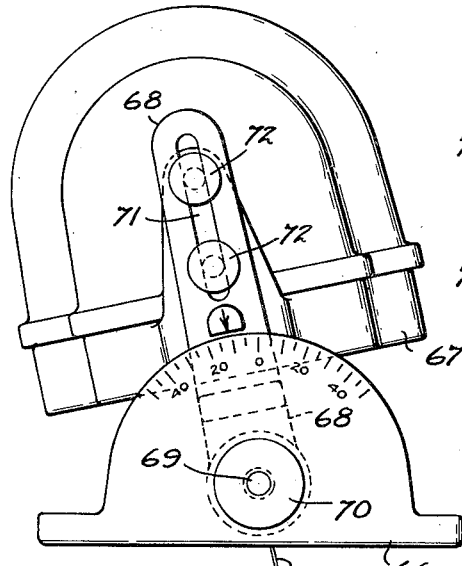
Fig. 8 is a rear elevation of a modified device in which the portion of the frame carrying the reciprocating blade and vibrator is mounted for angular adjustment with respect to the base, to enable the blade to cut a bevel.
Figure 9:
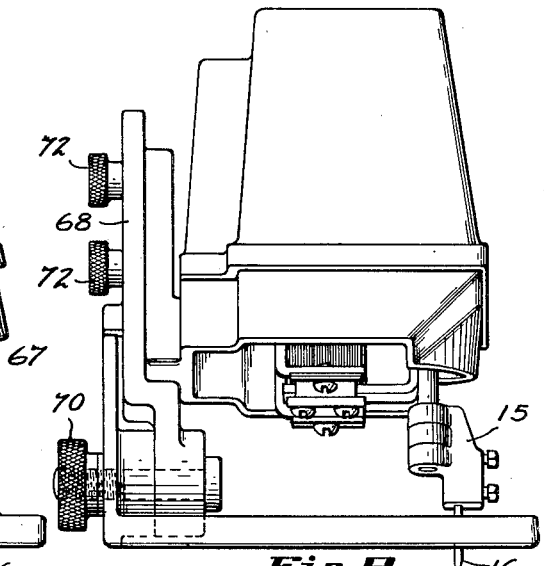
Fig. 9 is a side elevation of the cutter shown in Fig. 8.

In Fig. 8 of the drawings there is shown a supporting base 66 and a support 67 for the cutter supporting and actuating mechanism, which is carried by an arm 68 secured to the base to swing about a horizontal axis 69 and is adapted to be secured in adjusted position by means of a clamping screw 70. The mechanism supporting portion 67 may be secured to the arm 68 for vertical adjustment thereon by means of a slot 71 in the arm and set screws 72 for clamping the support in adjusted position on the arm.

It will be apparent that the present invention provides a very simple, rugged and compact unit for cutting irregular designs in sheet material by guiding the device over the surface of the material, that the cutter blade will readily follow the direction of movement of its supporting frame, and that due to the vibration of the frame there is very little frictional resistance to movement of the device over the surface of the material being cut.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A cutter of the character described, comprising a supporting frame, an electromagnet including a U-shaped laminated core carried by said frame and an armature, a leaf spring parallel with the base of said core and spaced below the same, a leaf spring spaced above the top of said core, fixed supports for opposite ends of each of said springs, a member fixed to the armature and attached to each of said springs intermediate the ends thereof, said member being normally supported by the springs with the armature out of contact with the core, a blade carried by the armature carrying member, and means for intermittently energizing the electro-magnet.

2. A cutter of the character described, comprising a supporting frame, an electromagnet including a U-shaped laminated core and an armature, said core having its base portion fixed to the frame and its spaced arms extending upwardly from the base, the ends of said arms being beveled, said armature having beveled ends for engagement with the beveled ends of the core arms, means for supporting and guiding the armature comprising a leaf spring supported at its ends and extending across the space between the core arms, said spring being attached intermediate its ends to the armature and normally supporting the armature out of contact with the core, a cutter blade connected to said armature, and means for intermittently energizing the electromagnet.

3. A cutter of the character described comprising a supporting frame, an electromagnet including a U-shaped laminated core having its base portion fixed to the frame and its spaced arms extending upwardly from the base, spaced members fixed to said core and having arms extending inwardly and spaced from the upper and lower ends of the core, a leaf spring anchored to the arms above the upper end of the core, a leaf spring having its ends anchored to the arms beneath the lower end of the core, a U-shaped member having arms attached to said leaf springs intermediate the ends thereof, an armature fixed to said U-shaped member and engageable with the upper end of the core, a cutter blade carried by said U-shaped member, and means for intermittently energizing said electromagnet.

4. A cutter of the character described comprising a supporting frame, an electromagnet including a core having its base portion fixed to the frame, a leaf spring extending across the upper end of the core and having its ends attached to supports fixed with respect to the frame, a second leaf spring parallel with the first and mounted on fixed supports below the core, a U-shaped member having arms fixed to said springs centrally thereof, an armature fixed to the upper arm of said U-shaped member, a blade carried by said U-shaped member, means for energizing said core including a winding, and means for interrupting the current to said winding including a normally closed switch mounted on the core which has a fixed contact and a spring contact arm, and adjustable means carried by said blade carrying member to open the switch upon a predetermined downward movement of the blade carrying member.

5. A machine of the character described comprising a supporting frame adapted to slide on material being cut, a pair of leaf springs, each of said springs having its ends secured to the frame at spaced points, a member supported and guided by said springs, said member being attached to the springs at points spaced from the points of attachment of the springs to the frame whereby said springs may flex to permit said member to have reciprocating movements with respect to the frame, a cutter carried by said member and extending vertically through said frame, and means on the frame for intermittently actuating said cutter carrying member out of the position in which it is normally held by said springs, said actuating means coacting with the springs to reciprocate said cutter carrying member to cause said cutter to reciprocate vertically through said frame.

6. A machine of the character described comprising a supporting frame adapted to slide on material being cut, a pair of leaf springs secured to the frame at spaced points substantially parallel with and above the base of the frame, a member supported and guided by said springs, said member being attached to the springs at points spaced from the points of attachment of the springs to the frame whereby said springs may flex to permit said member to have reciprocating movements with respect to the frame, a cutter carried by said member and extending through the base of said frame, an electromagnet comprising a core mounted on the frame and an armature carried by said cutter carrying member, and means for intermittently energizing said electromagnet to cause said cutter to reciprocate in a substantially vertical direction through said base.

7. A machine of the character described comprising a supporting frame adapted to slide on material being cut, a pair of leaf springs spaced apart one above the other in the frame, each spring being attached at opposite ends to the frame, a member supported and guided by said springs, said member being attached to each of the springs intermediate its ends, a cutter carried by said member, and means on the frame for intermittently imparting downward thrusts to the cutter supporting member, said thrust imparting means coacting with the springs to reciprocate said cutter carrying member to cause said cutter to reciprocate vertically through the base of said supporting frame.

8. A machine of the character described comprising a supporting frame adapted to slide on material being cut, a pair of leaf springs supported by said frame in spaced apart relation one above the other, said springs lying in substantially the same vertical plane, a member supported and guided by said springs, said member being attached to each of the springs intermediate its ends, a cutter carried by said member, means for imparting downward thrusts to the cutter supporting member, said thrust imparting means coacting with the springs to reciprocate said cutter carrying member to cause said cutter to reciprocate vertically.

BENTON N. EWING.